S. H. KYLE.
NUT LOCK.
APPLICATION FILED JULY 6, 1909.
947,616.
Patented Jan. 25, 1910.
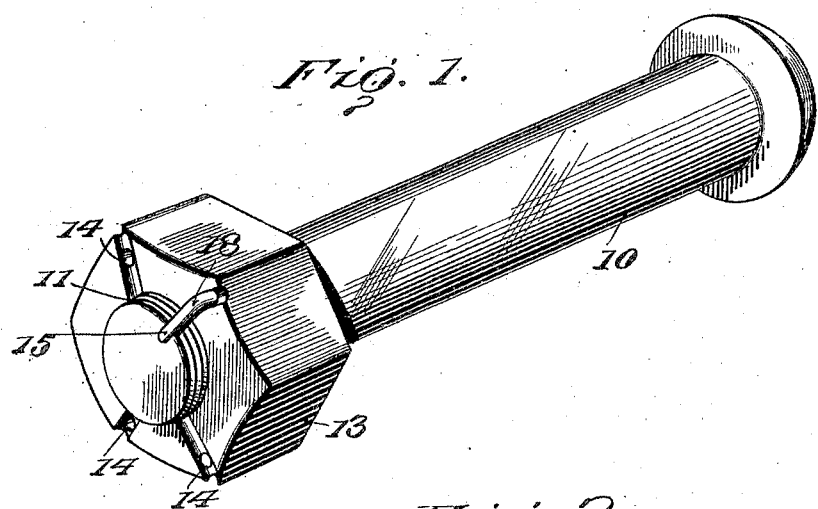
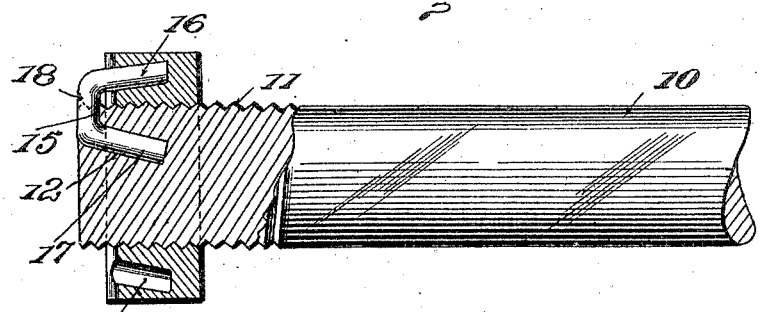
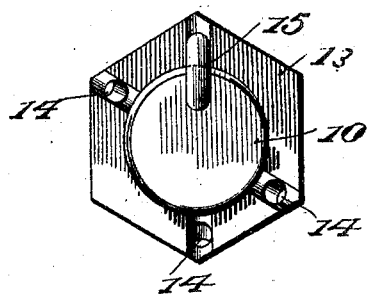
Inventor
S. H. Kyle.
Witnesses
By
Attorneys.

UNITED STATES PATENT OFFICE.

SAMUEL H. KYLE, OF CLINTON, ILLINOIS, ASSIGNOR OF ONE-HALF TO ROBERT A. OXLEY, OF GILMAN, ILLINOIS.

NUT-LOCK.

947,616.  Specification of Letters Patent.  Patented Jan. 25, 1910.

Application filed July 6, 1909. Serial No. 506,186.

*To all whom it may concern:*

Be it known that I, SAMUEL H. KYLE, a citizen of the United States, residing at Clinton, in the county of Dewitt and State of Illinois, have invented certain new and useful Improvements in Nut-Locks, of which the following is a specification.

This invention relates to lock nuts and refers to a novel formation and arrangement of elements to comprise the same.

An object of this invention is to provide a nut lock which is of extreme simplicity, insomuch that the parts or elements which comprise the same require but a slight change in the formation of the bolt and nut and a key is employed which may be made from a strip of hardened wire.

The invention has for another object the provision of a device of this character which may be locked quickly and in any adjusted position and one which may be readily released although it securely retains the nut upon the bolt when locked.

For a full understanding of the invention reference is to be had to the following description and accompanying drawings in which:—

Figure 1 is a perspective view of the complete nut lock. Fig. 2 is a longitudinal view of the same partly in section, and Fig. 3 is an end view of the bolt and nut having the improved key applied thereto.

Corresponding and like parts are referred to in the following description and indicated in all the views of the drawings by the same reference characters.

Referring to the drawing the numeral 10 designates a bolt which is threaded at one extremity as at 11 and which is provided at the threaded extremity with an inwardly or centrally inclined bore 12 which extends from a point adjacent the edge of the bolt 10 toward the central axis of the same. Upon the threaded extremity 11 a polygonal nut 13 is positioned which is provided in its outer face with a plurality of bores 14 which extend toward the edges of the nut 13 preferably at the meeting edges of the sides of the nut so as to insure strength to the device. The bores 14 extend from an intermediate point between the outer and inner edges of the nut 13 so as to diverge inwardly from the bore 12 formed in the bolt 10. A key 15 is employed which is formed of a portion of wire which is bent U-shape and hardened to provide arms 16 and 17 upon the key 15, the arms registering at their outer extremities with the bores 12 and 14 when the same are brought into registered relation with one another by the rotation of the nut 13. The key 15 is preferably provided with a flattened outer surface 18 by means of which the key 15 is adapted to be driven into the bores 12 and 14.

In operation the nut 13 is engaged upon the bolt 10 to the desired position and rotated until one of the bores 14 registers with the bore 12 formed in the end of the bolt 10 when the key 15 is placed in the outer extremity of the bores 12 and 14 and forced inwardly by striking the flattened surface 18 with a hammer, or the like, whereby the arms 16 and 17 are diverged as they enter the bores 12 and 14 and are retained in such locked position by such divergence. As the key 15 is formed of hardened metal the arms 16 and 17 are held rigidly in a diverged position and consequently do not permit of the withdrawal of the key 15 except upon the application of great force or of the breakage of the central portion of the key 15 to separate the arms 16 and 17 and to permit of the same to be operated independently.

Any number of bores 14 may be formed in the nut 13, the same preferably comprising a number which corresponds to the meeting edges of the sides of the nut as such meeting edges project outwardly from the center and form a strong support for the key 15 when positioned in the adjacent aperture 14.

Having thus described the invention what is claimed as new is:—

1. A nut lock including a threaded bolt having a bore eccentrically formed in one end thereof, said bore being extended inwardly and centrally toward the axis of said bolt, a nut engaged over the threaded portion of said bolt, and having a plurality of outwardly inclined bores in the outer face of the same and a key for engagement in said bores when registered.

2. A nut lock including a bolt having a single bore formed obliquely in the end thereof, a nut engaged over said bolt and having a plurality of oblique bores adapted to register singly with the bore in said bolt, and a U-shaped key carried by said nut and said bolt and driven in the bores and turned at its opposite ends for locking the same.

3. A nut lock including a bolt having a bore formed in one end thereof, the bore extended from a point adjacent the edge of the bolt inwardly and obliquely toward the axis of the bolt, a nut carried by said bolt and having a series of bores formed therein and extended from the outer face of the nut inwardly toward the sides of the nut and a key for engagement in the bolt and nut to lock the same.

4. In a nut lock the combination of a bolt having an inclined bore formed in the threaded end thereof, the bore extending from a point adjacent the edge of the bolt inwardly toward the central axis thereof, a nut engaged upon said bolt and having a plurality of inclined bores formed therein, the bores extending from the outer face of the nut toward the outer walls thereof, and a U-shaped key engaged in the bores in said bolt and said nut and adapted to be diverged at its outer ends to lock the same in position.

5. In a nut lock the combination with a bolt having an inclined bore formed in the threaded end thereof, and being centrally inclined, a nut engaged on said bolt, and having a plurality of inclined bores formed in the outer face thereof, the inclination of the bores in said nut being opposite to the inclination of the bore in said bolt and a U-shaped key engaged in the bores and diverged, and positioned in the same to lock the key in position.

In testimony whereof I affix my signature in presence of two witnesses.

SAMUEL H. KYLE. [L. S.]

Witnesses:
 R. A. LEMON,
 FRED J. SHELL.